H. C. MILLER.

COMBINED STAND AND HORN FOR TALKING MACHINES.

APPLICATION FILED JUNE 20, 1907.

Reissued May 25, 1909.

12,963.

3 SHEETS—SHEET 1.

Witnesses

Alice H. Bennett

Floyd Comwall

Inventor

H. C. Miller

Attorney

H. C. MILLER.

COMBINED STAND AND HORN FOR TALKING MACHINES.

APPLICATION FILED JUNE 20, 1907.

Reissued May 25, 1909.

12,963.

3 SHEETS—SHEET 2.

Witnesses

Alice F. Bennett

Floyd Cornwall

Inventor

H. C. Miller

By

Attorney

H. C. MILLER.

COMBINED STAND AND HORN FOR TALKING MACHINES.

APPLICATION FILED JUNE 20, 1907.

Reissued May 25, 1909.

12,963.

3 SHEETS—SHEET 3.

Witnesses

Alice H. Bennett.

Floyd Comora

Inventor

H. C. Miller

By

Attorney

UNITED STATES PATENT OFFICE.

HENRY C. MILLER, OF WATERFORD, NEW YORK, ASSIGNOR, BY MESNE ASSIGNMENTS, TO VICTOR TALKING MACHINE COMPANY, OF CAMDEN, NEW JERSEY, A CORPORATION OF NEW JERSEY.

COMBINED STAND AND HORN FOR TALKING-MACHINES.

No. 12,963. Specification of Reissued Letters Patent. Reissued May 25, 1909.

Original No. 793,013, dated June 20, 1905, Serial No. 235,722. Application for reissue filed June 20, 1907. Serial No. 379,993.

*To all whom it may concern:*

Be it known that I, HENRY C. MILLER, a citizen of the United States, residing at Waterford, in the county of Saratoga and State of New York, have invented new and useful Improvements in a Combined Stand and Horn for Talking-Machines, of which the following is a specification.

This invention relates to improvements in a combined stand and horn for a talking-machine.

Talking-machines now in use employ a horn extending out from the sound box, which is large, unsightly, and frequently takes up so much room that it is in the way. I have found that it is not essential to extend the horn from the machine and have therefore constructed a cabinet in which the talking-machine is placed and utilize the interior of the cabinet to accommodate a horn, and a deflector to distribute the sound. The object of combining these two elements is to economize space and at the same time provide means for utilizing a large horn without projecting it out from the talking-machine, as practiced with machines of this type now in use.

A further object of this invention is to provide a stationary horn in a cabinet with an adjustable exit that the sound may be directed to an audience at any angle.

Other objects and advantages will be hereinafter referred to and be particularly pointed out in the claims.

Figure 1:
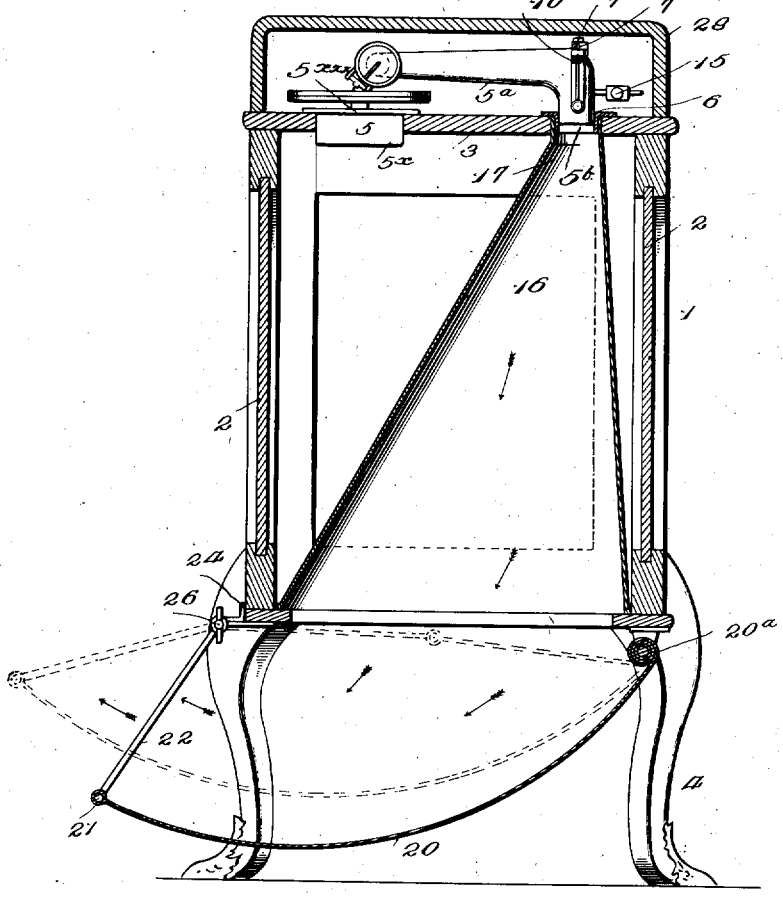
Figure 2:
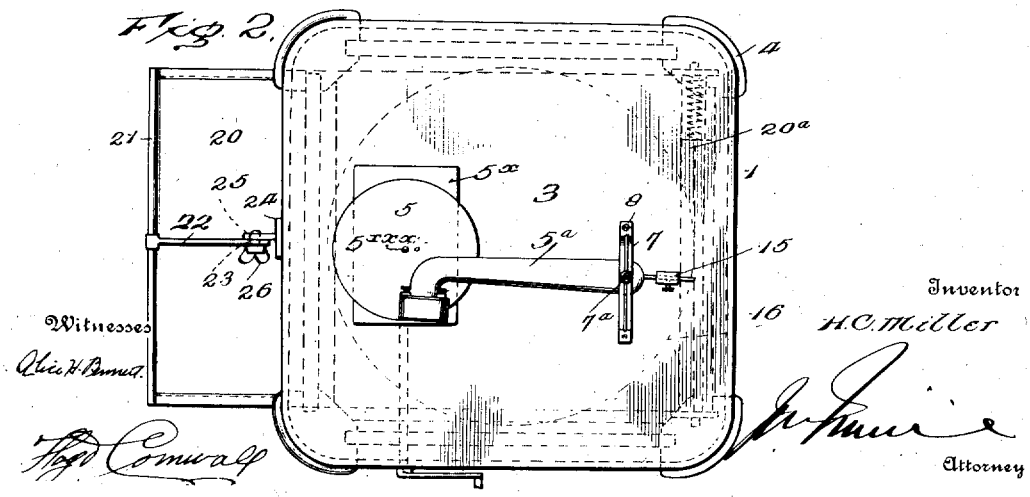
Figure 6:
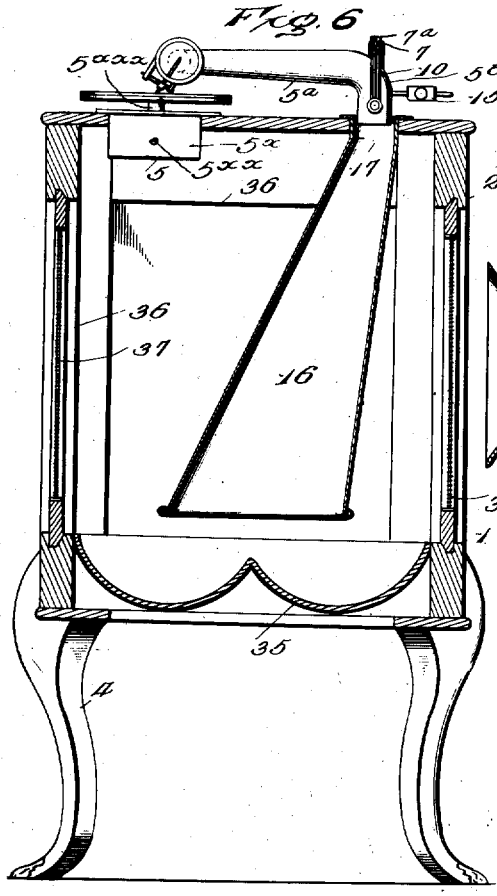
Figure 7:
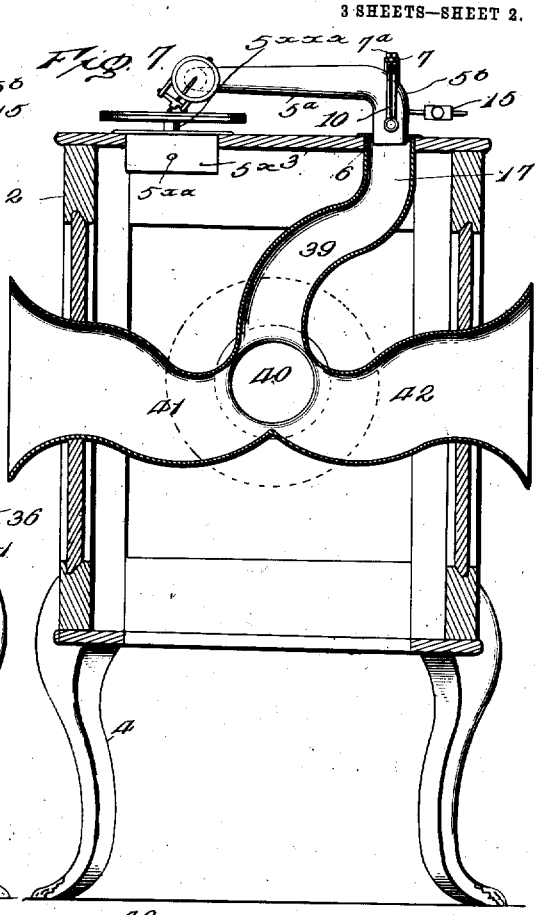
Figure 8:
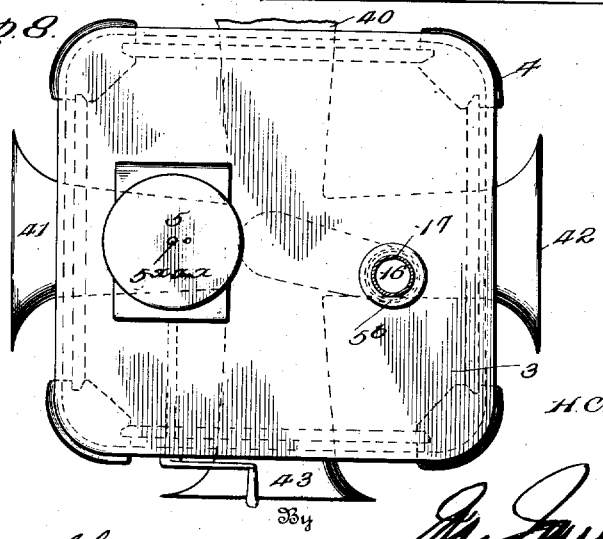
Figure 4:
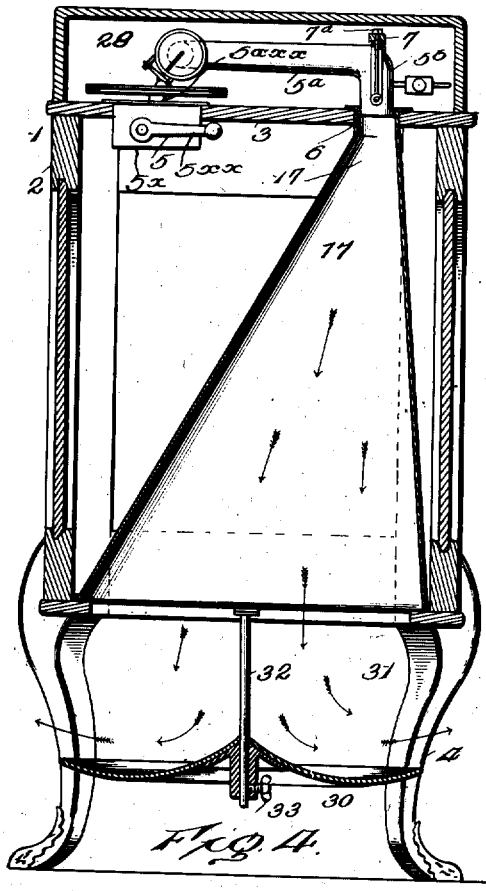
Figure 3:
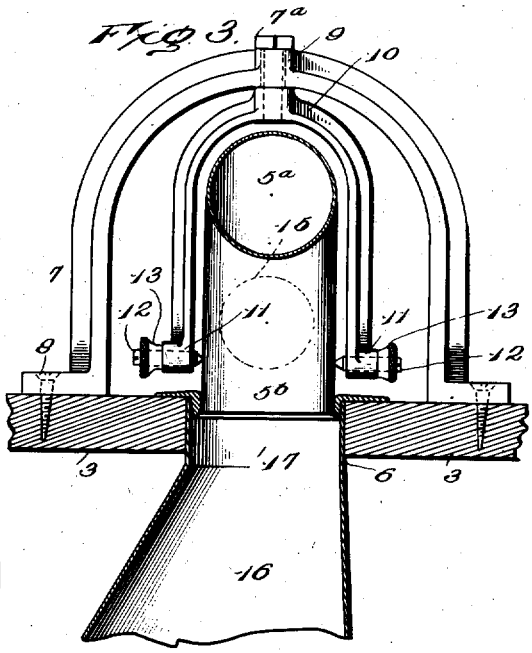
Figure 5:
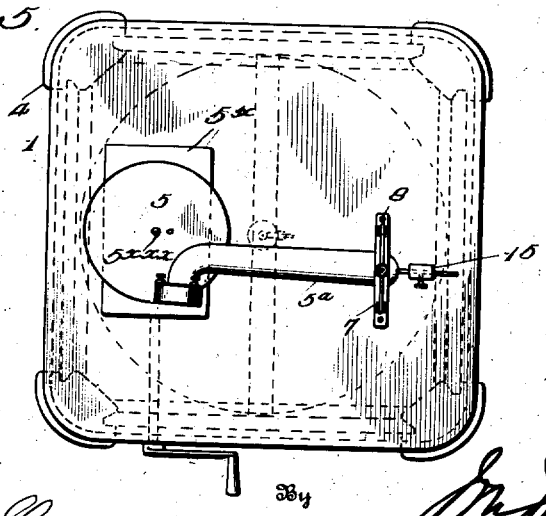

In the drawings, Figure 1 is a sectional view of the preferred form of my invention. Fig. 2 is a top plan view with the cover removed. Fig. 3 is a detail transverse vertical section of the means employed for supporting the pipe leading from the talking-machine to the horn and the connection between the pipe and the horn. Fig. 4 is a vertical sectional view of a modified form of my invention. Fig. 5 is a plan view of the same. Fig. 6 is a vertical section of a different modification. Fig. 7 is a similar view of a further modification. Fig. 8 is a plan view of the modification shown in Fig. 7.

The numeral 1 indicates a cabinet composed of sides 2, top or support 3, and legs 4. The top 3 is cut out to receive a talking-machine 5, which may be of any well-known type, and connected to the sound-box is a tube $5^a$, having the outer end $5^b$ turned down. The talking machine includes a casing $5^\times$, extending within the cabinet below the support 3, and includes operating means, parts of which are indicated by the handle $5^{\times\times}$, and the disk post $5^{\times\times\times}$. An opening 6 is formed in the top 3 opposite the talking-machine, and straddling the opening is a yoke 7, fastened in place by screws 8, and provided at about its center with a vertical opening 9, the center of said opening being coincident with the center of the opening 6. A smaller yoke 10 is swiveled to the yoke 7 by a bolt $7^a$, passing through the opening 9, and at the terminals of the yoke 10 are alined openings 11 11 to receive pointed screws 12 12, which receive lock nuts 13 13. The points of the screws 12 bind the turned-down end $5^b$ of the tube $5^a$ to fasten the latter to the yoke 10. This construction permits the tube to turn horizontally, the screw $7^a$ being the pivotal connection. A weight 15, is mounted on a rod extending from the tube to counterbalance the tube and the sound box.

16 indicates a horn made conical, its smaller end 17, fitting in the opening 6 and its larger end or mouth extending to the bottom of the cabinet 1. A suitable packing is interposed between the turned-down end $5^b$ of the tube $5^a$ and the upper end 17 of the horn. Obviously the purpose of the packing is to prevent the escape of sound at this point.

Connected to the bottom of the cabinet and communicating with the horn is arranged an adjustable flexible sound-deflector 20. The deflector may be secured to the bottom of the cabinet in any suitable manner, but preferably by a spring-roller $20^a$, and at its front end is a bar 21, having connected to it an arm 22, provided with an opening 23. Adjacent the arm is a bracket 24, fastened to the cabinet and formed with an opening 25. A set-screw 26 passes through the openings 23 and 25 to set the mouth of the deflector at a convenient angle. By making the deflector of flexible material it can be rendered adjustable without the necessity of making joints, &c., which would retard the sound waves.

The spring-roller 20[a] is of the usual type and can be used to roll the deflector under the cabinet when not in use.

While I have described one form of means for holding the deflector after it has been adjusted, I desire it to be distinctly understood that it is in no wise intended as a limitation.

28 indicates a cover hinged to the cabinet to shield the talking-machine.

In operation the talking-machine is started and the sound passes through the tube 5[a] to the horn 16, thence to the deflector, and out to the atmosphere. The sound striking the deflector is thrown out into the atmosphere in a soft blended tone. The "brassy" sound so prevalent with talking-machine horns is almost entirely removed.

By swiveling the tube at one end, as described, the end of said tube and the horn are always retained in alinement.

In the modification shown in Figs. 4 and 5 the horn 16 and its connection with the talking-machine are the same as in Figs. 1 to 3; but the deflector is made in the form of a concavo-convex disk 30, and the space 21 is formed between the bottom of the horn and the disk for the exit of sound. The disk is formed with a central hole which receives a standard 32, depending from the bottom of the cabinet, the disk being secured to the standard by a set-screw 33, so that the volume of sound emitted through the space 31 can be quickly and conveniently controlled.

In the form of my invention shown in Fig. 6 a concavo-convex disk 35 is located inside the cabinet 1, and the sound passes to the atmosphere through opening 36, covered with net or fine gauze 37. In many instances this construction gives decidedly satisfactory results; but by reason of it not having an adjustable deflector the sound cannot be regulated.

From the foregoing it will be seen that I have provided a simple and neat stand for a talking-machine and have also arranged a convenient means for accommodating the horn. Such a construction as before stated, absolutely removes the unsightly and awkward appearance of the horn extending from the talking machine. Furthermore, by providing the adjustable deflector the range, tone, and volume of sound is under perfect control of the operator.

In Figs. 7 and 8 I have provided the horn 39 with four branches 40, 41, 42, and 43, a branch passing through an opening in each side of the cabinet and forming a deflector. The area of the branch tubes about equals the area of one of the big horns shown in Fig. 1, so that the sound produced is equal in volume to the preferred form.

It will be seen from the foregoing that my invention has for its object, among others, to provide improvements in apparatus for reproducing sound from a record of the same, by means of which the quality and naturalness of the recorded sounds are reproduced with greater faithfulness and also with a reduction of the commingled, extraneous sounds which are usually present, and which appear to be made by the operation of the reproducing apparatus, for instance, among others the scratching usually produced by the contact of the reproducing stylus and record when reproducing, and other sounds given out by parts of the apparatus when in operation, among which may be mentioned the sounds that might be made by the motor when operating. Among the other objects of my invention is to provide apparatus for imparting resonance to the reproduced sounds; to modify such sounds after amplification; to deflect the sounds after amplification, and to protect and conceal the operative parts of the apparatus to improve the appearance of the talking machine as a whole, so as to provide an ornamental piece of furniture.

One of the foregoing objects of my invention, namely, the improvement in the quality and naturalness of the reproduction, and which is accomplished in my apparatus, is due to the inclosing of the stationarily mounted amplifier, shown in the different figures of the drawings, and is not dependent upon the means for modifying or deflecting the sound, nor for preventing the scratching from commingling with the reproduced sounds, that is to say, I have found it in practice that so inclosing the amplifier does improve the quality and naturalness of the reproduced sound, and having secured such new result, I desire to claim broadly, an apparatus embodying such means. I have also found that when there is an air space between the amplifying means and its inclosing casing, improved results appear to be attained, and still more so when this air space between the amplifying means and its casing may be open to the atmosphere, so that sounds therein may commingle with the sounds emanating from the interior of the amplifier. This part of my invention rests for its novelty upon the new results which are accomplished thereby, namely,—(1) the inclosing of the amplifier; (2) the formation of the air space around said amplifier; and (3) the opening of said air space as described, as hereinbefore claimed, and are three different subdivisions of this part of my invention, and, as before stated, are independent of the means of modifying and deflecting the sounds after amplification, or the means by which the commingling of the scratching and the amplified sounds is reduced. I have also found that such amplifier so arranged acts as a resonator, or, in other words, it provides a combined amplifier and resonator, by which resonance is imparted to the amplified sounds which, of course, is an advantage and a new result, and, although I append hereto claims to cover such a structure, my broad invention of employing an inclosed resonator, or an inclosed combined amplifier and resonator is not limited to cross sectional shape thereof.

In addition to the results I have just described there is, of course, the modification and deflection of the reproduced sounds after amplification, which is accomplished by the deflectors described, although it will be understood that such a sound deflector and modifier could be arranged in various other shapes.

It is obvious that by inclosing the reproducing apparatus within the compartment formed by the cover 28, I am enabled to reduce the amount of scratching which commingles with the sounds emanating from the combined amplifier and resonator, and also the sounds that emanate from the outside of the diaphragm, which would otherwise commingle with the amplified sound to which resonance has been imparted, are reduced.

If preferred, the motor or operating means can be inclosed within the casing 5×, and when so inclosed said casing serves to confine, to a great extent, therein, any noises which might be caused by the said operating means when in operation.

In addition to the improvement in the quality and naturalness of the reproduction by inclosing the amplifier, it is manifest, of course, that the appearance of the complete apparatus is made much more pleasing, and permits a greater latitude in improving the appearance of the device.

For the purpose of preventing extraneous forces from interfering with the vibration of the amplifier walls, or, in other words, preventing extraneous vibration of the amplifier and detracting from the purity of the tone reproduced, means are provided for embracing the major portion, or one of the sections, of the amplifier, and this means may vary within wide limits. In the best constructions, however, this embracing means will consist of an inclosure in which the major portion of the amplifier is located. The inclosure may be variously located. In the best constructions, however, it will be so located as to embrace the major portion of the amplifier in a position below the record and talking machine. The amplifier may be variously located within the inclosure, and the inclosure itself will serve as a rigid support for the major portion of the amplifier. The inclosure being stationary and the major portion of the amplifier being rigidly supported by the inclosure, it follows that the major portion of the amplifier is supported in a fixed position within the inclosure, and below the record and talking machine. In the best constructions, the inclosure is formed by the walls and partitions of the cabinet inclosing the entire apparatus.

For the purpose of preventing extraneous noises from detracting from the purity of the tone reproduced, means are provided for isolating extraneous noise from the sounds or tones issuing from the amplifier. As hereinbefore explained, the noise produced by the operating mechanism of the talking machine is isolated by its inclosure in a compartment. Other noises detrimental to the purity of the reproduced tone are, however, found in machines heretofore constructed. Means are provided, therefore, for isolating the noise produced by the contact of the reproducer stylus with the record from that issuing from the amplifier, and this means may vary within wide limits. In the best constructions, this means consists in a compartment in which the record and reproducer are located.

It is understood, of course, that my invention is not confined to the particular form of apparatus herein shown and described, and, therefore, I claim broadly the right to employ all equivalent instrumentalities coming within the scope of the claims, and by means of which objects of my invention are attained, and the new results accomplished, as herein set forth, as it is obvious that the particular embodiment herein shown and described is only one of many that can be employed to attain these objects and accomplish these results.

What I claim is—

1. In combination, a casing having a support for a talking machine, legs supporting the casing and forming a space at the bottom of the casing, a horn extending downwardly below the support and terminating to discharge sound in the space, and a deflector at the bottom of the horn, the horn being inclosed by the casing.

2. In combination, a casing having a support for a talking-machine, a horn extending downwardly below the support, a deflector at the bottom of the horn, the horn being inclosed by the casing, a tube adapted to communicate with the talking-machine and the upper end of the horn, and a swiveled connection at the end of the tube which communicates with the horn, said connection comprising a stationary standard, a yoke connected to the tube and swiveled to the standard.

3. In combination, a casing having a support for a talking machine, legs supporting the casing and forming a space at the bottom of the latter, a horn extending downwardly below the support and terminating to discharge sound in the space, and a deflector at the bottom of the horn and mounted in the space, a tube adapted to communicate with a talking-machine, the tube and horn being inclosed in the casing.

4. In combination, a casing having a support for a talking machine, a horn inclosed by the casing, and a flexible deflector at the mouth of the horn.

5. In combination, a casing having a support for a talking machine, a horn inclosed by the casing, a flexible deflector at the mouth of the horn, and means for adjusting the deflector.

6. In combination, a casing having a support for a talking machine and a space formed below the casing, a horn inclosed by the casing and extending downwardly to the bottom of the casing, and an adjustably-mounted deflector in the space and adjacent the mouth of the horn.

7. In combination, a casing having a talking machine support, a cover over the support to form a separate compartment for the talking machine, a horn depending from the support, a tube above the support and adapted to communicate with a talking-machine and the horn, the horn being inclosed within the casing below the support, and a deflector at the mouth of the horn.

8. In combination, a casing, a support in the casing, a horn projecting through an opening in the support, a tube communicating with a talking-machine and the horn, a hanger, a yoke secured to the tube, and swiveled connection between the yoke and hanger, the horn being inclosed in the casing.

9. In combination, a casing, a support for a talking-machine, a horn within the casing, and extending downwardly toward the bottom of the same, a flexible deflector at the bottom of the casing and communicating with the mouth of the horn, and means for adjusting the mouth of the deflector.

10. In combination, a stand for a talking-machine, a horn within the stand, a flexible deflector adjacent the exit of the horn, and means for folding the deflector when not in use.

11. In combination, a stand for a talking machine, a horn inclosed within the stand, a flexible deflector at the mouth of the horn, means holding the deflector open, and means for folding the deflector when not in use.

12. In combination, a stand for a talking machine, a horn inclosed within the stand with its mouth at the bottom of the latter, a flexible deflector under the stand and opposite the mouth of the horn, means holding the deflector open, and spring-actuated means for folding the deflector under the stand.

13. A casing having a shelf or wall dividing it into two compartments, a talking machine supported by said shelf, only the record support, reproducer and reproducer connections being on one side of said shelf in one compartment, said connections extending to said shelf, and a sound amplifier in the other compartment communicating with the outside and with said connections.

14. In combination, a casing having a talking machine support, a cover over the support, a talking machine casing extending in the cabinet below the support, a talking machine including a reproducer, the latter being in the compartment formed by the cover, a sound conveyer extending from the sound reproducer toward the support, a horn connected to the sound conveyer, said horn being inclosed in the cabinet below the support, and a deflector at the mouth of the horn.

15. A talking machine comprising a casing, a movable deflector for said casing, a talking machine including a sound reproducer, a sound conveyer extending from said sound reproducer toward said deflector, and a partition separating said reproducer from said sound conveyer.

16. A casing having a sound deadening partition dividing it into two compartments, a talking machine mounted in one of said compartments, only the record support, reproducer and reproducer connections being on one side of said sound deadening partition, said connections extending to said sound deadening partition, and a sound amplifier in the other compartment communicating with the outside and with said connections.

17. A talking machine comprising a casing, a movable deflector carried by said casing, a sound reproducer within said casing, means for operating said reproducer, a sound conveyer extending from said reproducer toward said deflector, and a wall within the casing separating said reproducer from said sound conveyer.

18. A sound reproducing machine, comprising a casing, an adjustable deflector for said casing, a sound reproducer within said casing, an inner casing, operating means in the inner casing, a sound conveyer extending from said reproducer toward said deflector beneath said inner casing.

19. A sound reproducing machine comprising a casing having an opening, a sound reproducer inclosed within the casing, an inner casing, a horn extending below said latter casing, a sound conveyer connecting said reproducer with said horn, and an adjustable deflector operable to cover the opening and the mouth of the horn.

20. A sound reproducing machine comprising a casing, a removable cover upon said casing, a sound reproducer within said casing, a compartment within said casing, talking machine operating mechanism within said compartment, a horn, a sound conveyer connecting said reproducer with said horn, a hinged deflector carried by the said casing adjacent said horn to deflect and modify the reproduced sound.

21. A sound reproducing machine comprising a casing formed with an opening and having two compartments, a sound reproducer within one of the compartments, operating means, a swinging sound conveyer extending from the reproducer to one wall of the compartment containing said reproducer, a horn located in the other compartment and extending from the sound conveyer to the opening in the casing.

22. The combination with a talking machine and horn connected thereto, of a casing completely inclosing said talking machine and horn, and a swinging deflector located adjacent the mouth of said horn for modifying the sound emitted from the horn.

23. In combination, a cabinet having two compartments separated by a partition, a talking machine having its operating mechanism below the partition, a reproducer, a horn inclosed in one of the compartments, a sound conveyer extending from the reproducer to the horn, and a cover for the compartment containing the reproducer.

24. A talking machine comprising a casing provided with an opening and having a hinged cover, a partition adjacent the cover, talking machine operating means supported beneath the partition, a talking machine including a sound reproducer, said reproducer being above the partition and accessible by moving the cover, and a horn extending from the reproducer to the opening in the cabinet.

25. In combination, a cabinet formed with an opening and having a partition, a talking machine including a reproducer, a part of the talking machine being on one side of the partition, all of the parts of the talking machine including the reproducer being entirely inclosed within the cabinet to deaden the sound, and a sound conveyer and sound amplifier also inclosed within the cabinet and connected to said reproducer for communicating the sound to the atmosphere, the mouth of the sound amplifier fitting snugly the opening in the cabinet.

26. In combination, a cabinet formed with an opening and having a partition for forming two compartments, a talking machine including a reproducer, a part of the talking machine being on one side of the partition in one of the compartments, all of the parts of the talking machine including the reproducer being entirely inclosed within the cabinet to deaden the sound, a swinging sound conveyer communicating with the reproducer, a stationary sound amplifier also inclosed within the cabinet and communicating with the sound conveyer and the amplifier, the partition being located to separate the reproducer from the mouth of the amplifier.

27. In combination, a cabinet formed with an exit opening and having a partition for forming two compartments, a talking machine including a reproducer, a part of the talking machine being on one side of the partition in one of the compartments, the reproducer being in the other compartment and entirely inclosed within the cabinet to deaden the sound, a sound conveyer and sound amplifier also inclosed within the cabinet and connected to said reproducer for communicating the sound to the atmosphere, the partition being located to separate the reproducer from the mouth of the amplifier.

28. In combination, a casing having a support, a cover over the support and with the same forming a separate compartment, a talking machine mounted on the support and including a reproducer operating in the compartment, a swinging sound conveyer connected to the reproducer, a stationary horn communicating at one end with the sound conveyer, and a pivoted connection between the sound conveyer and the stationary horn.

29. A casing formed with an opening and a shelf having a talking machine supported thereon, only the record support, reproducer and reproducer connections being on one side of said shelf, a sound amplifier in the compartment on the other side of the shelf and communicating at one end with said connections, and its opposite free end contacting with the casing and communicating with the opening in said casing.

30. A casing having a partition formed with an opening and dividing it into two compartments, one of said compartments having an opening, a talking machine within the casing, only the record support, reproducer and reproducer connections being on one side of said partition in one compartment, said connections extending to the opening in the partition, the sound passing to the atmosphere through the opening in the other said compartment.

31. In combination, a casing opened at its bottom and having a support, a talking machine carried by the support, legs supporting the casing to form a space at the bottom of said casing, a horn within the casing, the mouth of the horn registering with the opening in the bottom in the casing to allow the sound from the record carried by the talking machine to diffuse between the legs, and means connecting the talking machine with the horn.

32. In combination, a casing open at its bottom and having a support, a talking machine carried by the support, amplifying means in the casing, means connecting the amplifying means with the talking machine, means supporting the said casing, the said supporting means forming openings which communicate with the opening in the bottom of the casing, the said openings diffusing the sound from the amplifying means in more than one direction.

33. In combination, a cabinet formed with two openings, means for amplifying sound, said amplifying means fitting snugly the openings in the cabinet, a talking machine including a reproducer, and sound conveyer outside the compartment and communicating with the amplifying means.

34. In combination, a casing having a support, a cover over the support and with the same forming a separate compartment, a talking machine including a reproducer operating in the compartment, a movable sound conveyer connected to the reproducer, a stationary amplifier communicating at one end with the sound conveyer, and a connection between the sound conveyer and the stationary amplifier to permit movement of said sound conveyer.

35. In combination, a cabinet formed with an opening and having a partition also formed with an opening, the partition dividing the compartment into two compartments, a talking machine including a record support and reproducer inclosed within the cabinet, a part of the talking machine being on one side of the partition in one compartment, the record support and reproducer being on the other side of the partition in the other compartment, a sound conveyer communicating with the reproducer, said sound conveyer passing through and fitting snugly the opening in the partition and its outer end registering with the opening in the cabinet, and means permitting movement of the reproducer in its compartment.

36. In combination, a cabinet having a movable closure, a sound reproducing machine including a sound box and connections, a stationary horn communicating with the sound box connections and extending beyond the closure, the sound box and the connections being entirely inclosed within the closure.

37. In a talking machine, the combination with sound reproducing means, of a coöperating sectional sound-directing amplifier connected therewith, a divided cabinet inclosing the talking machine and one of the sections of the amplifier above the talking machine and inclosing and supporting the other section of the amplifier below the talking machine.

38. In a talking machine, the combination with a record and sound reproducing means, of a coöperating amplifier connected therewith, an inclosure supporting the major portion of the amplifier, a compartment inclosing the operating mechanism of the talking machine to isolate the sound produced thereby from that issuing from the amplifier, and a cover inclosing the reproducer stylus and record to isolate the sound produced by their contact from that issuing from the amplifier.

39. A sound reproducing machine comprising a cabinet divided into two acoustically non-communicating compartments separated by a partition, a sound reproducer in one of said compartments, a sound amplifier in the other of said compartments and communicating through said partition with said reproducer.

40. A sound reproducing machine comprising a cabinet, a partition provided with an opening and separating said cabinet into two acoustically non-communicating compartments, a reproducer inclosed in one of said compartments, a sound amplifier in the other of said compartments, and a sound conveyer fitting said opening in said partition and communicating with said reproducer and said amplifier.

41. A sound reproducing machine comprising a cabinet, a partition provided with an opening and separating said cabinet into two acoustically non-communicating compartments, a reproducer in one of said compartments, a sound amplifier in the other compartment, a sound conveyer fitting said opening in said partition and communicating with said reproducer and said amplifier, said latter compartment being provided with a sound exit opening and said amplifier having its sound exit end fitting about said opening.

42. In a talking machine, the combination with a cabinet formed in its bottom with an opening, a talking machine including a reproducer, the reproducer being separated from the body of the cabinet, a horn extending downwardly in the cabinet to direct the sound downwardly through the opening in the bottom of said cabinet, and a sound conveyer communicating with the horn and the reproducer.

43. In a talking machine, a casing having an opening, sound amplifying means stationarily mounted within said casing and inclosed thereby, the large end of said amplifying means terminating at about said opening in the casing, a sound conveying tube mounted upon said casing and having one end connected with the small end of said amplifying means, sound reproducing means at the other end of said sound conveying tube and a record support mounted upon said casing.

44. In a talking machine, the combination with sound reproducing means, of a coöperating amplifier connected with the reproducing means, and means for preventing extraneous vibration of the amplifier.

45. In a talking machine, the combination with sound reproducing means, of an amplifier coöperatively connected therewith, means for preventing extraneous vibration of the amplifier, and means for isolating extraneous sound from that issuing from the amplifier.

46. In a talking machine, the combination with sound reproducing means, of a coöperating resonating amplifier connected therewith, means for preventing extraneous vibration of the amplifier, and means for modifying and deflecting the sound operating upon the sound waves after they have passed through the amplifier.

47. A casing having means dividing the same into compartments, reproducing mechanism supported within one of said compartments, a sound amplifier in the other of said compartments, said reproducing mechanism and amplifier communicating through the said means, and said amplifier communicating with the outside of said casing.

48. In a talking machine, sound reproducing means, stationarily mounted sound amplifying means, a movable sound conductor connecting the said sound reproducing and sound amplifying means, and a casing inclosing said amplifying means for preventing extraneous vibration of the latter.

49. In a talking machine, sound reproducing means, sound resonating means, a movable sound conductor connecting the said sound reproducing and sound resonating means, and a casing inclosing said resonating means for preventing extraneous vibration of the latter.

50. In a talking machine, sound reproducing means, stationarily mounted sound amplifying and resonating means, a movable sound conductor connecting said sound reproducing means and said amplifying and resonating means, and a casing inclosing said amplifying and resonating means for preventing extraneous vibration thereof.

51. In a talking machine, sound reproducing means, stationarily mounted sound amplifying means, a movable sound conductor connecting said sound reproducing and sound amplifying means and a casing inclosing said amplifying means for preventing extraneous vibration thereof and providing an air space around said amplifying means.

52. In a talking machine, sound reproducing means, combined amplifying and resonating means, a movable sound conductor connecting said sound reproducing means and said amplifying and resonating means, and a casing inclosing said resonating and amplifying means for preventing extraneous vibration thereof.

53. In a talking machine, sound reproducing means, stationarily mounted amplifying means, a movable sound conductor connecting said sound reproducing and sound amplifying means, and a casing inclosing said amplifying means for preventing extraneous vibration thereof, and providing an air space around said amplifying means communicating with the outside atmosphere.

54. In a talking machine, sound reproducing means, stationarily mounted sound amplifying means, a movable sound conductor connecting said sound reproducing and sound amplifying means, and a casing inclosing the major portion of said amplifying means for preventing extraneous vibration thereof.

55. In a talking machine, a casing having an opening, sound amplifying means stationarily mounted within said casing and inclosed thereby, the large end of said amplifying means terminating at about said opening in the casing, a sound conveying tube carried by said casing and having one end connected with the small end of said amplifying means, sound reproducing means at the other end of said sound conveying tube, and a record support carried by said casing.

56. In a talking machine, non-communicating casings, sound reproducing means inclosed within one of said casings, sound amplifying means inclosed within the other of said casings, said sound reproducing and sound amplifying means being connected by a sound conductor extending through the partition between said casings.

57. In a talking machine, non-communicating casings, sound reproducing means inclosed within one of said casings, sound amplifying means inclosed within the other of said casings, said sound reproducing and sound amplifying means being connected by a sound conductor extending through the partition between said casings, and a movable closure for the mouth of said amplifying means.

58. In a talking machine, non-communicating casings, sound reproducing means inclosed within one of said casings, sound amplifying means inclosed within the other of said casings, said sound reproducing and sound amplifying means being connected by a sound conductor extending through the partition between said casings, and a movable closure for the casing containing the sound reproducing means.

59. In a talking machine, non-communicating casings, sound reproducing means inclosed within one of said casings, sound amplifying means inclosed within the other of said casings, said sound reproducing and sound amplifying means being connected by a sound conductor extending through the partition between said casings, the casing around said amplifying means providing an air space surrounding the latter.

60. In a talking machine, non-communicating casings, sound reproducing means inclosed within one of said casings, sound amplifying and resonating means inclosed within the other of said casings, said sound reproducing and sound amplifying and resonating means being connected by a sound conductor extending through the partition between said casings.

61. In a talking machine, sound reproducing means, stationarily mounted amplifying means connected therewith, a casing separate from but inclosing said amplifying means, and means for deflecting the sound after amplification.

62. In a talking machine, sound reproducing means, stationarily mounted amplifying means connected therewith, a casing separate from but inclosing said amplifying means, and means for modifying the sound after amplification.

63. In a talking machine, sound reproducing means, stationarily mounted amplifying means connected therewith, a casing separate from but inclosing said amplifying means, and means for deflecting and modifying the sound after amplification.

64. In a talking machine, a casing having an opening, stationarily mounted amplifying means inclosed in said casing, the large end of said amplifying means being situated at about said opening in the casing, an adjustable closure for the opening in said casing, and sound reproducing means carried by said casing and connected with said amplifying means.

65. In a talking machine, non-communicating casings, sound reproducing means inclosed within said casings, sound amplifying means being inclosed in the other of said casings and connected with said sound reproducing means through the partition between said casing, and a movable closure for the casing within which said sound reproducing means are situated.

66. In a talking machine, non-communicating casings, sound reproducing means situated within one of said casings, sound amplifying means situated in the other of said casings and connected with said sound reproducing means, and movable closures for each of said casings.

67. In a talking machine, sound reproducing means, a record support, stationarily mounted amplifying means connected with said sound reproducing means, a casing inclosing said amplifying means for preventing extraneous vibration thereof, a motor for said record support and a casing inclosing said motor.

68. In a talking machine, the combination with sound reproducing means, of a coöperating stationary amplifier connected with the reproducing means, and means for preventing extraneous vibration of the amplifier.

69. In a talking machine, the combination with sound reproducing means, of a coöperating stationary amplifier flexibly connected with the reproducing means, and means for preventing extraneous vibration of the amplifier.

70. In a talking machine, the combination with a record, of a reproducer, means for producing a relative movement of said record and reproducer whereby sound is reproduced, an amplifier connected with the reproducer, and means for preventing extraneous vibration of the amplifier.

71. In a talking machine, the combination with a record, of a reproducer, means for producing a relative movement of said record and reproducer whereby sound is reproduced, a stationary amplifier connected with the reproducer, and means for preventing extraneous vibration of the amplifier.

72. In a talking machine, the combination with a record, of a reproducer, means for producing a relative movement of said record and reproducer whereby sound is reproduced, a stationary amplifier connected with the reproducer, and an inclosure for preventing extraneous vibration of the amplifier and rigidly supporting the major portion of the amplifier.

73. In a talking machine, the combination with a record, of a reproducer, means for producing a relative movement of said record and reproducer whereby sound is reproduced, a stationary amplifier connected with the reproducer and shaped to cause the travel of the sound-waves to deviate from a straight line, and means for preventing extraneous vibration of the amplifier.

74. In a talking machine, the combination with a record, of a reproducer, means for producing a relative movement of said record and reproducer whereby sound is reproduced, a stationary amplifier connected with the reproducer and shaped to cause the travel of the sound-waves to deviate from a straight line, and an inclosure supporting the major portion of the amplifier for preventing extraneous vibration of said amplifier.

75. In a talking machine, the combination with a record operating in a fixed position, of a coöperating traveling reproducer, an amplifier connected with the reproducer, and means for preventing extraneous vibration of the amplifier.

76. In a talking machine, the combination with a record operating in a fixed position, of a coöperating traveling reproducer, an amplifier connected with the reproducer, and an inclosure supporting the major portion of the amplifier in a fixed position and for preventing extraneous vibration thereof.

77. In a talking machine, the combination with a record, of a coöperating traveling reproducer the motion of which is controlled by the record, a stationary amplifier connected with the reproducer, and means for preventing extraneous vibration of the amplifier.

78. In a talking machine, the combination with a record, of a coöperating traveling reproducer the motion of which is controlled by the record, a stationary amplifier connected with the reproducer, and an inclosure embracing the major portion of the amplifier for preventing extraneous vibration thereof.

79. In a talking machine, the combination with a record, of a coöperating traveling reproducer, a stationary amplifier flexibly connected with the reproducer, and means for preventing extraneous vibration of the amplifier.

80. In a talking machine, the combination with a record operating in a fixed position, of a coöperating traveling reproducer, an amplifier connected with the reproducer and shaped to cause the travel of the sound-waves to deviate from a straight line, and means for preventing extraneous vibration of the amplifier.

81. In a talking machine, the combination with a record operating in a fixed position, of a coöperating traveling reproducer, an amplifier connected with the reproducer and shaped to cause the travel of the sound-waves to deviate from a straight line, and an inclosure supporting the major portion of the amplifier in a fixed position for preventing extraneous vibration thereof.

82. In a talking machine, the combination with a record, of a coöperating reproducer, an amplifier connected with the reproducer and located below the record, and means for preventing extraneous vibration of the amplifier.

83. In a talking machine, the combination with a record operated in a fixed position, of a coöperating traveling reproducer, an amplifier connected with the reproducer and located below the record, and means for preventing extraneous vibration of the amplifier.

84. In a talking machine, the combination with a record operating in a fixed position, of a coöperating traveling reproducer located above said record, an amplifier located below said record and connected with the reproducer, and an inclosure supporting the major portion of said amplifier below said record.

85. In a talking machine, the combination with sound reproducing means, of an amplifier coöperatively connected therewith, and means for supporting the major portion of the amplifier and preventing extraneous vibration of the same.

86. In a talking machine, the combination with sound reproducing means, of an amplifier coöperatively connected therewith, and an inclosure below the talking machine within which is positioned the major portion of the amplifier.

87. In a talking machine, the combination with sound reproducing means, of a coöperating amplifier connected therewith, and an inclosure supporting the major portion of the amplifier below the talking machine.

88. In a talking machine, the combination with sound reproducing means, of a coöperating amplifier connected therewith, and an inclosure supporting the major portion of the amplifier in a fixed position below the talking machine.

89. In a talking machine, the combination with sound reproducing means, of a stationary amplifier coöperatively connected therewith, a compartment completely inclosing the talking machine operating mechanism, and means for preventing extraneous vibration of the amplifier.

90. In a talking machine, the combination with sound reproducing means, of a stationary amplifier coöperatively connected therewith, a compartment completely inclosing the talking machine operating mechanism, and a non-communicating inclosure embracing the major portion of the amplifier.

91. In a talking machine, the combination with sound reproducing means, of a coöperating amplifier connected therewith, a compartment completely inclosing the talking machine operating mechanism, and a non-communicating inclosure supporting the major portion of the amplifier in a fixed position.

92. In a talking machine, the combination with sound reproducing means, of a sectional sound-directing amplifier coöperatively connected therewith, and means for preventing extraneous vibration of the major section of the amplifier.

93. In a talking machine, the combination with sound reproducing means, of a coöperating sectional sound-directing amplifier connected therewith, and an inclosure supporting the major section of the amplifier below the talking machine.

94. In a talking machine, the combination with sound reproducing means, of a coöperating sectional sound-directing amplifier connected therewith, a compartment completely inclosing the talking machine operating mechanism, and a non-communicating inclosure supporting the major section of the amplifier in a fixed position.

95. In a talking machine, the combination with sound reproducing means, of a coöperating sectional jointed sound-directing amplifier connected therewith, a divided cabinet inclosing the talking machine and one of the sections of the amplifier above the talking machine and inclosing and supporting the other section of the amplifier in a fixed position below the talking machine.

96. In a talking machine, the combination with sound reproducing means, of an amplifier coöperatively connected therewith, an inclosure embracing the major portion of the amplifier, and additional means for isolating extraneous sound from that issuing from the amplifier.

97. In a talking machine, the combination with sound reproducing means, of a coöperating amplifier connected therewith, an inclosure supporting the major portion of the amplifier, and additional means for isolating extraneous sound from that issuing from the amplifier.

98. In a talking machine, the combination with sound reproducing means, of a coöperating amplifier connected therewith, means for supporting the major portion of the amplifier and preventing extraneous vibration of the same, and a compartment inclosing the operating mechanism of the talking machine to isolate the sound produced thereby from that issuing from the amplifier.

99. In a talking machine, the combination with sound reproducing means, of a coöperating amplifier connected therewith, an inclosure supporting the major portion of the amplifier, a compartment inclosing the operating mechanism of the talking machine to isolate the sound produced thereby from that issuing from the amplifier, and means for isolating the sound produced by the contact of the reproducer stylus with the record from that issuing from the amplifier.

100. In a talking machine, the combination with sound reproducing means, of a cooperating resonating amplifier connected therewith, an inclosure supporting the major portion of the amplifier in a fixed position and providing an air space around the same, and means for modifying and deflecting the sound operating upon the sound-waves after they have passed through the amplifier.

101. A talking machine, comprising a main casing, an adjustable closure for said casing, a sound reproducer within said main casing, a motor casing containing the talking machine operating means, and a sound conveyer extending from said reproducer toward said closure, the said motor casing separating said operating means from said sound conveyer.

102. A sound reproducing machine, comprising a main inclosing cabinet, a sound reproducer within said cabinet, a motor compartment for the talking machine operating means, an amplifying horn, an adjustable closure for said main cabinet in front of the mouth of said horn, and a sound conveying tube connecting said reproducer with said horn.

103. A sound reproducing machine, comprising a main casing, an adjustable closure for said casing, a sound reproducer within said casing, a motor casing containing the talking machine operating means, and a sound conveyer extending from said reproducer toward said closure and beneath said operating means.

104. A sound reproducing machine comprising a sound reproducer inclosed within a main casing, an inner motor casing, an amplifying horn beneath said casing, a sound conveyer connecting said reproducer with said amplifying horn, an adjustable closure in the front of the main casing and in front of the mouth of said horn.

105. A casing having a partition forming compartments, reproducing mechanism supported within one of said compartments, a stationary sound amplifier in the other of said compartments, said reproducing mechanism and amplifier communicating through the partition between said compartments, and said amplifier communicating with the outside of the casing.

106. In a talking machine, a casing having an opening, sound amplifying means stationarily mounted within said casing and inclosed thereby, the large end of said amplifying means terminating at about said opening in the casing, a sound conveying tube within said casing and having one end connected with the small end of said amplifying means, sound reproducing means at the other end of said sound conveying tube, and a record support within said casing.

107. In a talking machine, sound reproducing means, sound resonating means, a movable sound conductor connecting the said sound reproducing and sound resonating means, and a casing separate from the resonator but inclosing the same and shutting off extraneous sounds from the talking machine to said resonator.

In testimony whereof I affix my signature in the presence of two witnesses.

HENRY C. MILLER.

Witnesses:
WM. F. PALMER,
JNO. IMIRIE.